Figures 13, 14, 15:
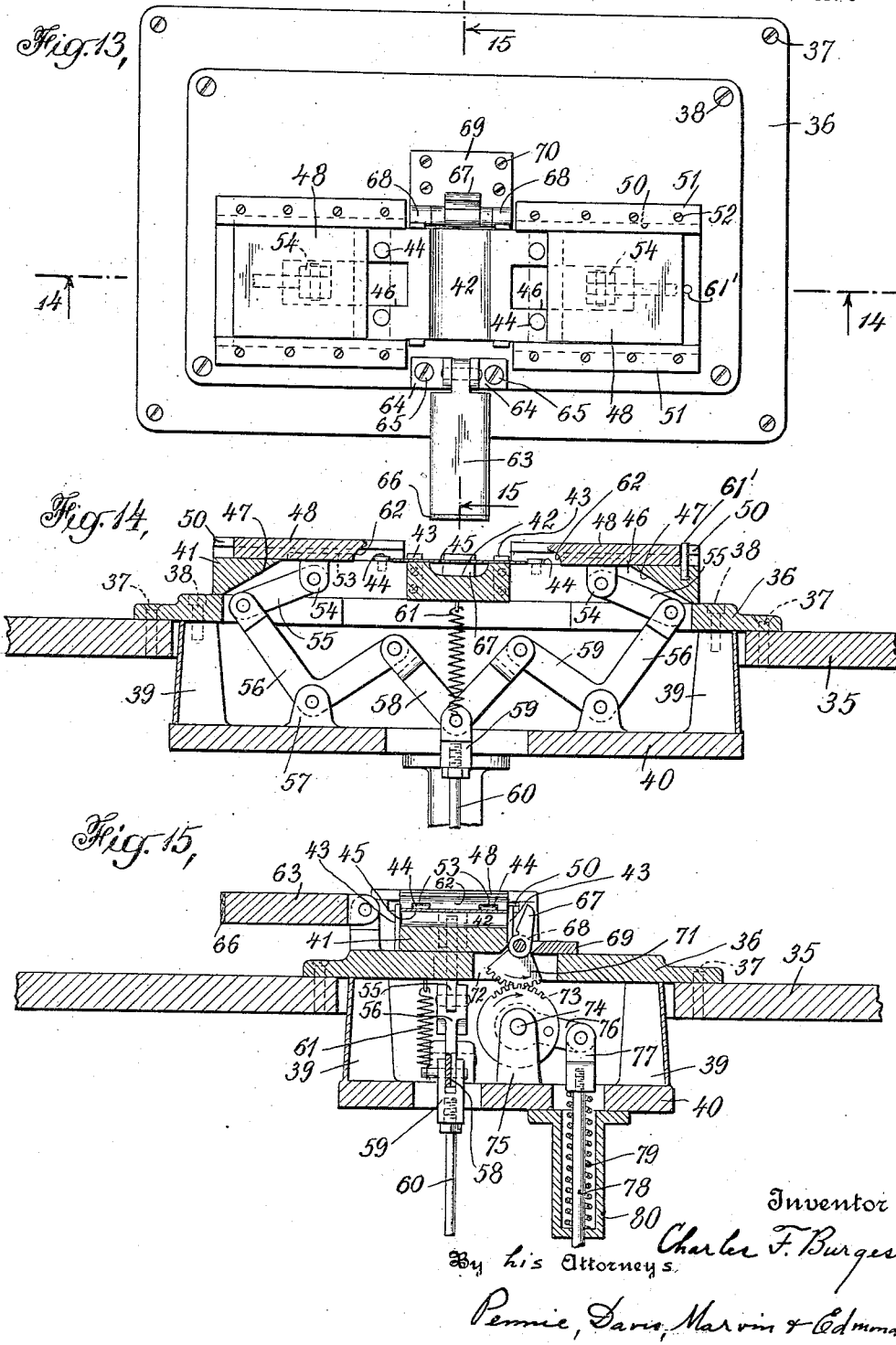

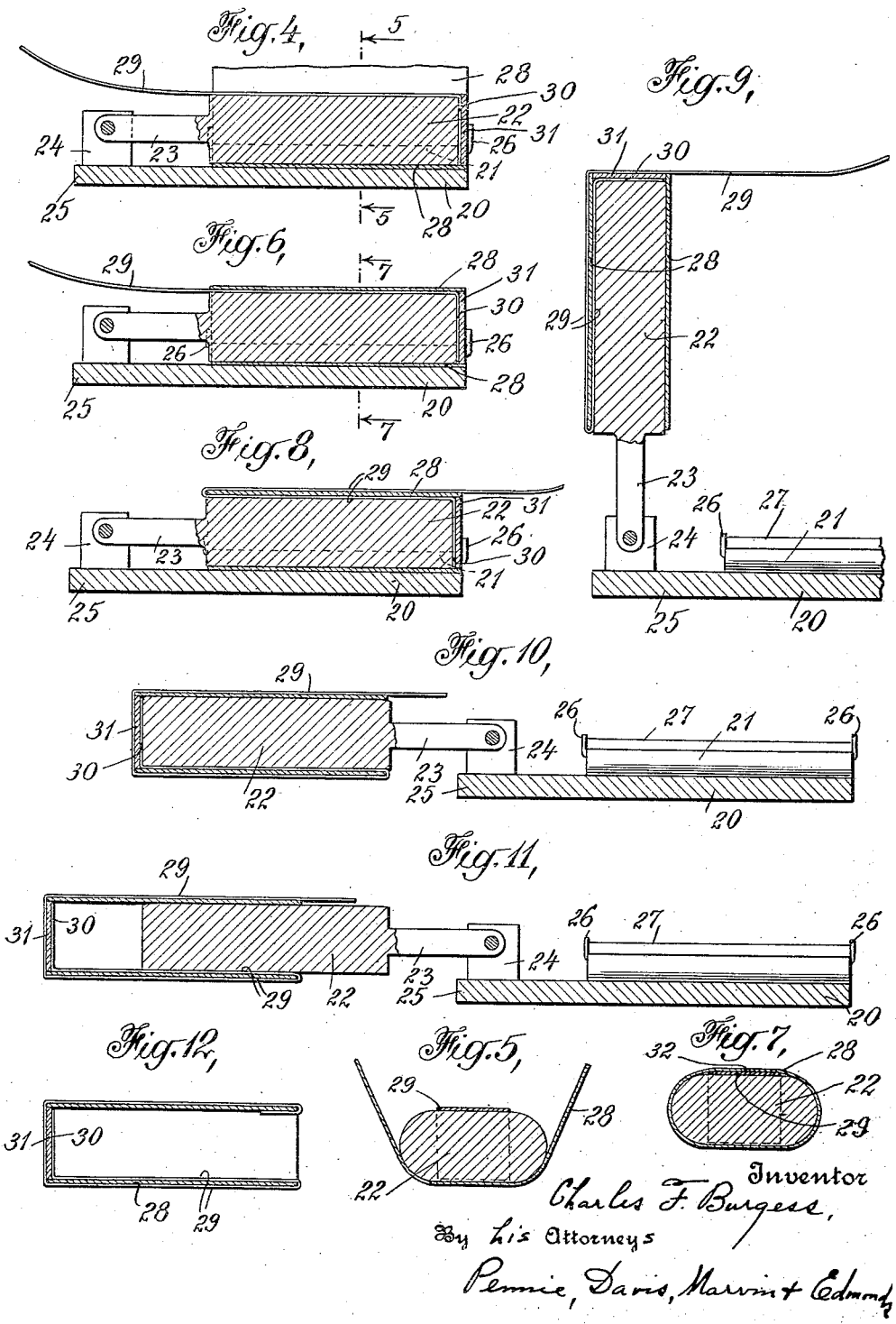

C. F. BURGESS.
APPARATUS FOR MAKING BATTERY WRAPPERS.
APPLICATION FILED AUG. 15, 1917.

1,284,583.

Patented Nov. 12, 1918.
4 SHEETS—SHEET 3.

Inventor
Charles F. Burgess
By his Attorneys
Pennie, Davis, Marvin & Edmonds

C. F. BURGESS.
APPARATUS FOR MAKING BATTERY WRAPPERS.
APPLICATION FILED AUG. 15, 1917.
1,284,583.
Patented Nov. 12, 1918.
4 SHEETS—SHEET 4.
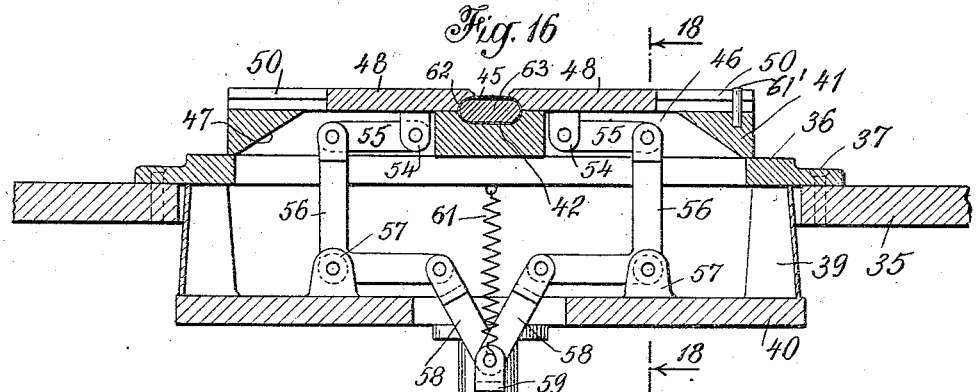
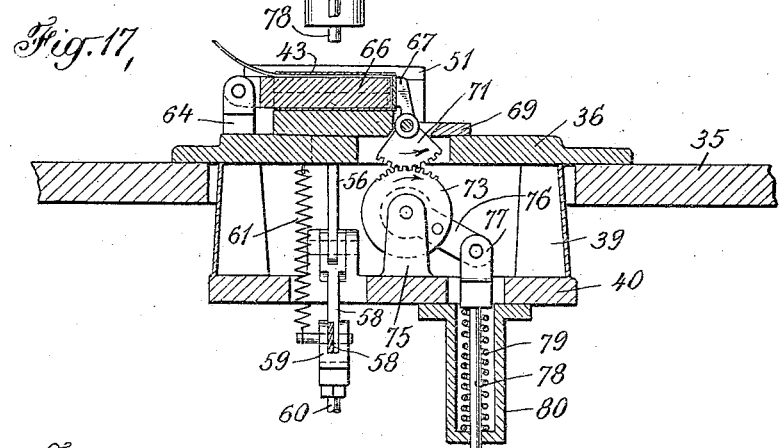
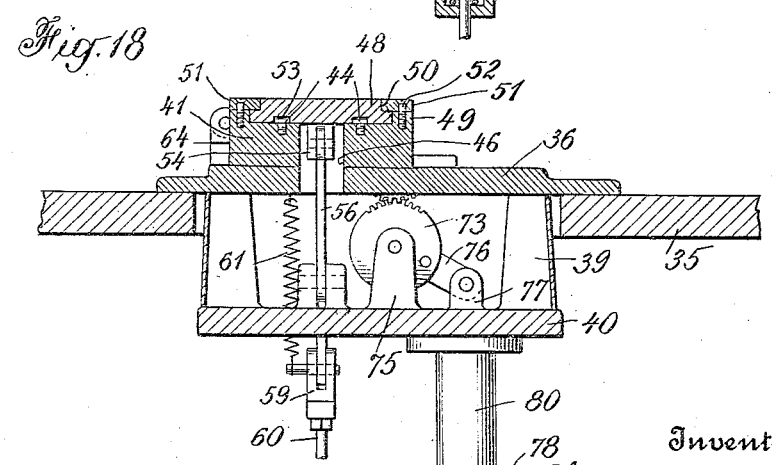
Inventor
Charles F. Burgess,
By his Attorneys
Pennie, Davis, Marvin & Edmonds

UNITED STATES PATENT OFFICE.

CHARLES F. BURGESS, OF MADISON, WISCONSIN, ASSIGNOR TO BURGESS BATTERY COMPANY, A CORPORATION OF WISCONSIN.

APPARATUS FOR MAKING BATTERY-WRAPPERS.

1,284,583. Specification of Letters Patent. Patented Nov. 12, 1918.

Application filed August 15, 1917. Serial No. 186,277.

*To all whom it may concern:*

Be it known that I, CHARLES F. BURGESS, a citizen of the United States, residing at Madison, in the county of Dane, State of Wisconsin, have invented certain new and useful Improvements in Apparatus for Making Battery-Wrappers; and I do hereby declare the following to be a full, clear, and exact description of the invention, such as will enable others skilled in the art to which it appertains to make and use the same.

The present invention relates to an apparatus for making battery wrappers, particularly those adapted to hold the small dry cells which are used in pocket flash lights, although the invention is not limited to the production of wrappers for batteries of small size, for by suitable enlargement of the various parts of the apparatus, the latter may be used for making battery wrappers of any desired size.

It is an object of the invention to provide an apparatus of simple and yet substantial construction by means of which the materials that are used for making a battery wrapper may be held in place during the forming operation, thereby promoting rapidity and cheapness of manufacture and requiring a minimum expenditure of manual labor.

A further object of the invention is to provide a modified form of apparatus in which certain steps of the operation of manfacturing the wrappers may be carried out even more rapidly than upon the simpler form of apparatus referred to above.

Further objects and advantages of the invention will appear from a detailed description of certain embodiments thereof, as illustrated in the accompanying drawings in which Figure 1 is a perspective view of a simple form of apparatus; Fig. 2 is a view similar to Fig. 1 showing the mandrel holding in place a sheet of material to form the wrapper; Fig. 3 is a view partly in section of a wrapper formed on the apparatus of the present invention; Figs. 4 to 12 inclusive are detail views representing various steps in the formation of an article by showing the positions occupied by the mandrel and the materials of which the wrapper is made during the cycle of operations: Figs. 5 and 7 are sectional views taken along the lines 5—5 of Fig. 4, and 7—7 of Fig. 6, respectively; Fig. 13 is a plan view of a modified form of apparatus; Fig. 14 is a sectional elevation of the apparatus along the line 14—14 of Fig. 13; Fig. 15 is a sectional elevation along the line 15—15 of Fig. 13; Fig. 16 is a view similar to Fig. 14 showing the condition of the apparatus at a subsequent stage of the operation; Fig. 17 is a view similar to Fig. 15 but showing a later condition of the apparatus, and Fig. 18 is a view in section along the line 18—18 of Fig. 16.

Referring to the drawings and particularly to Figs. 1 and 2, 20 represents a base plate which may be constructed of wood, metal or any other suitable material. This base plate is provided with a central groove 21 of a shape and size corresponding to the shape and size of one-half of the wrapper which is to be formed on the apparatus. A mandrel 22 is adapted to coöperate with the groove and this mandrel has the shape and dimensions of the interior of the wrapper which is to be formed thereon, except that it is a trifle shorter. The mandrel is provided with an extension 23 pivoted to lugs 24 extending upwardly from a shelf 25 projecting from the end of the base plate 20. In order to place the sheet of material of which the wrapper is to be formed in the right position upon the base plate, the latter is provided with guides 26 at its sides and other guides 27 attached to its ends.

In using the apparatus to form a battery wrapper the shelf 25 is placed toward the operator and the mandrel is turned into the position shown in Fig. 1. A sheet of material 28 of the required size is then laid upon the base plate and the mandrel moved into the position shown in Fig. 2, whereupon the paper will be drawn into a position substantially like that shown in this figure. The operator then takes a strip of tape 29 which has been coated with adhesive and moistened and places it upon the top of the mandrel with one end 30 extending over the free end of the mandrel as shown most clearly in Fig. 4. The gummed side of the tape is exposed and to the end portion of the tape is attached an oval bottom 31 which may be of cardboard or any other desired material. Since the mandrel is of slightly less length than the wrapper formed thereon, the material will project over the free end of the mandrel forming a recess of depth just sufficient to receive the bottom, per edges and into these recesses are fitted plates 51, attached to the top of the guides 49 by screws 52. Since the formers are intended to slide back and forth on the base plate, they should be provided with grooves 53 on their under surfaces to permit them to move over the stops 44 projecting from the upper surface of the base plate. Each former has attached to its under side a lug 54 to which is pivoted a link 55, the other end of which is pivoted to one end of a bell crank lever 56 mounted in a bracket 57 extending upwardly from the supporting plate 40. There is a link and a bell crank lever for each former and the adjacent ends of the levers are connected by links 58 to a fork 59 attached to the end of an operating rod 60 which may extend beneath the apparatus to a pedal (not shown) by which the rod may be actuated. In order to hold the formers in separated position, and to restore them to this position after each operation, a spring 61 may be provided. A stop 61' projecting above the base plate may be provided for limiting the outward movement of the formers. The meeting edges of the formers are provided with recesses 62 having a curvature like that of the corresponding parts of the depression in the base plate so that when these formers are brought into operation, they will fold the material over the edges of the mandrel 63. This is pivoted to lugs 64 which may be integral with or attached to the bed plate by screws 65. The free end of the mandrel may be covered by a pad 66 of felt or other suitable material to aid in pressing the tape and the bottom of the wrapper together.

On the other side of the base plate and in position to engage the free end of the mandrel when it is placed in the depression in the base plate is a presser 67 which may be mounted between lugs 68 attached to a plate 69 which in turn may be attached to the bed plate by screws 70. The presser 67 is formed with a depending sector 71 extending through an aperture 72 in the bed plate. The geared surface of the sector is engaged by a gear 73 mounted on a shaft 74 between bearings 75 extending upwardly from the supporting plate 40. Attached to the gear or to the shaft upon which it is mounted is a crank arm 76, at the outer end of which is a fork 77 attached to the upper end of the rod 78 which extends downwardly to a pedal (not shown) by which the gear may be actuated to bring the presser 67 into engagement with the end of the mandrel. In order to retain the presser in normal position out of engagement with the end of the mandrel, a spring 79 is placed around the rod 78 and engages the under side of the fork 77 and at its other end is held in place by a cylindrical cap 80 attached to the under side of the supporting plate 40 and having at its lower end an aperture through which the rod 78 passes.

In the normal condition of the apparatus, the spring 61 holds the formers 48 in the position shown in Fig. 14 and spring 79 holds the presser in position shown in Fig. 15. The sheet of material out of which the sides of the wrapper are to be formed is laid upon the base plate as indicated at 45 in Fig. 14 and is properly positioned by the guides 43 and 44. The mandrel 63, which at the beginning of the operation should occupy the position shown in Fig. 13 is then swung over and dropped into the depression 42 carrying the material after it and causing the edges of the material to assume an upright position corresponding in general to the condition shown in Fig. 2. A strip of gummed tape is then laid upon the top of the mandrel with its end placed over the free end of the mandrel. As in the case of the simple apparatus shown in Figs. 1 and 2, the mandrel of the present embodiment is formed of a slightly lesser length than the desired article so that the material forming the sides of the latter projects slightly beyond the end of the mandrel forming a space adapted to receive the bottom of the wrapper which is stuck to the end of the tape and then retained in place by the presser 67 which is actuated by the pedal connected to the rod 78. The pedal connected to the rod 60 is next actuated to draw down this rod and through the links and bell crank levers to cause the formers 48 to approach each other and fold the free edges of the material down on top of the mandrel and hence into engagement with the gummed tape which has previously been laid along the upper side of the mandrel. The operation of attaching the edges of the paper to this gummed tape may, if necessary, be aided by the operator who presses them upon the tape. The space between the ends of the formers when they are in operative position, will be sufficient to permit the operator to fold the tape over the edge of the wrapper and along the upper side of the meeting edges so that these edges are securely united before the formers are withdrawn. Both pedals are then released to permit the formers to be restored to their normal position and to cause the presser 67 to be drawn away from the bottom of the mandrel. The condition of the apparatus and the relative arrangement of the parts of the wrapper corresponds, at this stage of the operation, to Fig. 8. The mandrel 63 is then swung upwardly to permit the operator to fold the tape over the bottom of the wrapper corresponding to the step illustrated in Fig. 9. The mandrel is then dropped into its outer position and the tape folded along the other side as shown in Fig. 10. After the removal of the wrapper from the mandrel, the free end of the tape may be folded over the edge of the wrapper or left in extended position for subsequent attachment after the cells have been assembled within the wrapper.

By means of the apparatus described above, the manufacture of wrappers may be carried out even more conveniently than with the simple apparatus illustrated in Figs. 1 and 2 since the sides of the wrapper and the bottom thereof may be held in place during certain periods of the operation by mechanism actuated by the feet of the operator, thus rendering it necessary for the operator to use only his hands in manipulating the tape and pressing it into position.

While certain embodiments of the invention have been shown and described, it will be understood that various changes in the details of this apparatus as well as still further modifications of the invention may be made without departing from the principle thereof.

G. W. EMRICK.
MACHINE FOR MAKING ARMORED CABLE AND THE LIKE.
APPLICATION FILED MAY 15, 1917.
1,284,625. Patented Nov. 12, 1918.
5 SHEETS—SHEET 1.
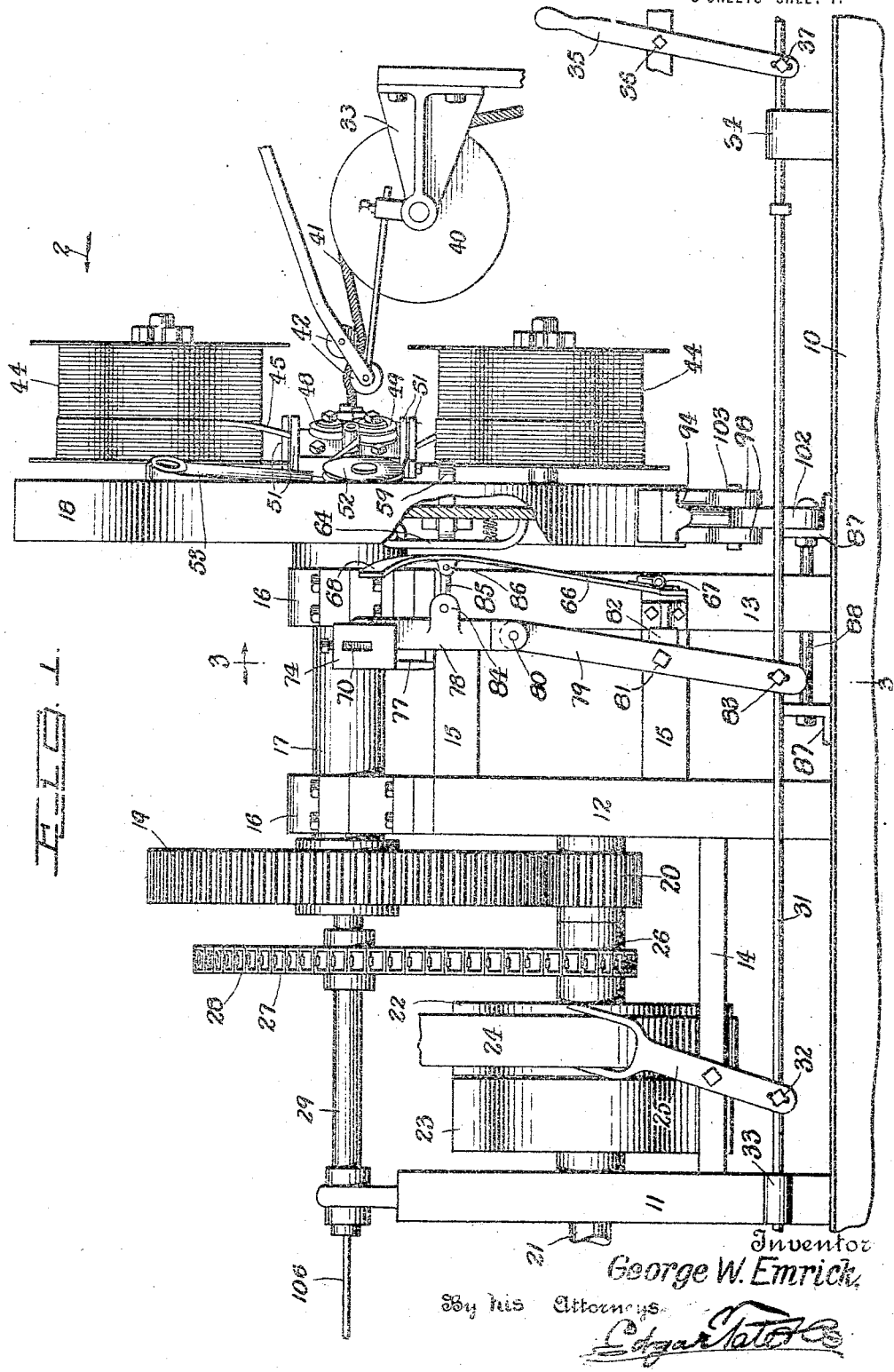
Inventor
George W. Emrick,
By his Attorneys

I claim:

1. In apparatus for making battery wrappers, the combination of a base member having a groove, and a mandrel pivoted to said base member and adapted to be turned bottom side up after the wrapper has been formed thereon, as and for the purpose described.

2. In apparatus for making battery wrappers, the combination of a base member having a groove, and a mandrel pivoted to said base member near one end of the groove and adapted to be swung from a position within the groove to a position on the other side of said pivot substantially in line with the groove, as and for the purpose described.

3. In apparatus for making battery wrappers, the combination of a base member provided with a groove, a mandrel pivoted thereto adapted to fit within the groove, the pivot point of the mandrel being located in line with the groove and adjacent one end thereof, and means on the base member for retaining a sheet of material in place to be wrapped around the mandrel when the latter is swung downwardly about its pivot into the groove.

4. In apparatus for making battery wrappers, the combination of a base member provided with a groove, a mandrel pivoted to the base member adjacent one end of the groove and adapted to be swung downwardly about its pivot into the groove, and stops on the base member for retaining a sheet of material in place to be wrapped around the mandrel when the latter is swung into the groove.

5. Apparatus for forming oval cases for flash-light batteries comprising a base plate having a groove therein and provided with stops on the ends and sides thereof and an extended portion at one end, and a mandrel formed to fit within the groove and provided with an extension directly pivoted at its ends to the extended portion of the base plate in line with the groove and adjacent one end thereof.

6. In an apparatus for making battery wrappers, the combination of a base member provided with a groove, guides on the base member extending at right angles to the length of the groove and arranged in pairs on each side of the groove, a mandrel pivotally attached to the base member and adapted to fit in the groove, means slidably mounted on the base member and retained in place by the guides and having concave edges for folding material around the mandrel and actuating means for said folding means.

7. In apparatus for forming battery wrappers, the combination of a stationary base member provided with a groove, a mandrel pivotally mounted adjacent the base member and adapted to fit in the groove, means slidably mounted on the base member for bending the material around the mandrel, means for actuating the bending means and means adapted to engage the free end of the mandrel when the mandrel is in position in the groove.

8. In apparatus for forming battery wrappers, a base member provided with a groove, side and end stops for positioning material on the base member, guides mounted on the base member, a swinging mandrel adapted to fit in said groove, means slidably mounted on the base member and retained in place by said guides for bending the material around the mandrel, said means being formed to pass over the side stops during the bending action and means for actuating said bending means.

9. In apparatus for making battery wrappers, the combination of a base member provided with a groove, guides on the base member, a mandrel pivotally mounted adjacent the base member and adapted to fit in the groove, means slidably mounted on the base member and retained in place by the guides and having concave edges for folding material around the mandrel, actuating means for said folding means and a presser adapted to engage the free end of the mandrel when the same is in position in the groove.

10. In apparatus for forming battery wrappers, the combination of a stationary base member provided with a groove, a rounded mandrel adapted to fit within the groove, and a presser member adapted to engage the free end of the mandrel when the same is in position in the groove.

11. In apparatus for forming battery wrappers, the combination of a stationary base member provided with a groove, a mandrel adapted to fit within the groove, a presser member adapted to engage the free end of the mandrel when the same is in position in the groove, and actuating means for the presser member.

12. In apparatus for forming battery wrappers, the combination of a base member having a groove and provided with slots extending through the base member on either side of the groove, guides mounted on the base member, a mandrel adapted to fit in the groove in the base member, means slidably mounted on the base member and retained by the guides for bending material around the mandrel, said means being provided with lugs passing through the slots in the base member, levers connected to the lugs for actuating the bending means and means associated with said levers for holding the bending means in normally separated position.

13. In apparatus for forming battery wrappers, the combination of a base member having a groove and provided with slots at either side of the groove, means for positioning material on the base member, guides on the base member, a mandrel adapted to fit within the groove, formers slidably mounted on the base member and retained by the guides, said formers being provided with concave edges for folding the material around the mandrel and having grooves on their lower surfaces to permit them to pass over the positioning means, lugs attached to the underside of the formers and passing through the slots in the base, levers connected to the lugs, actuating means for the levers, a spring associated with the levers for retaining the formers in normal separated position and a stop on the base member for limiting the movement of the formers.

14. In apparatus for making battery wrappers, the combination of a base member having a groove in its upper face, a mandrel pivotally mounted adjacent the base member and adapted to fit in the groove, a presser member adapted to engage the free end of the mandrel when the latter is in position in the groove, said presser member extending through a slot in the base member and being provided with a depending portion and means adapted to engage the depending portion of the presser member for actuating this member.

15. In apparatus for forming battery wrappers, the combination of a base member provided with a groove on its upper face, a mandrel pivotally mounted adjacent the base member and adapted to fit within the groove, a presser member adapted to engage the free end of the mandrel when the same is in position in the groove, said presser member being provided with a geared depending portion, and actuating means for the presser member comprising a gear engaging the depending portion, a crank arm associated with the gear and means connected to the crank arm for rotating the gear.

16. In apparatus for forming battery wrappers, the combination of a bed plate, a base member mounted on the bed plate and provided with a groove through the center of its upper face and having slots on either side of the groove, means for positioning the material on the base member, guides on the base member, a mandrel pivotally mounted adjacent the base member and adapted to fit within the groove, formers slidably mounted on the base member and held by the grooves, said formers having concave edges for folding material around the mandrel and being provided with grooves on their under faces to permit passage over the positioning means, lugs associated with the formers and passing through the slots in the base member, levers connected to the lugs, means for actuating the levers, a presser member adapted to engage the free end of the mandrel when in position in the groove, said presser member being provided with a depending portion, and means engaging said depending portion for actuating the presser member.

17. In apparatus for making battery wrappers, the combination of a base member provided with a groove, a mandrel adapted to fit in the groove and substantially equal in length to the length of the groove, said mandrel being formed at one end with a relatively short extension which is pivoted to the base member near one end of the groove, members slidably mounted on the base member on each side of the groove and having their inner edges shaped to coöperate with said mandrel to bend the material around the same when the mandrel is in place in the groove, each of said edges having a length substantially equal to the length of the mandrel and of the groove, and a presser member adapted to engage the free end of the mandrel when the same is in position in the groove.

In testimony whereof I affix my signature.

CHARLES F. BURGESS.